No. 711,602. Patented Oct. 21, 1902.
F. S. WEED.
COW TAIL HOLDER.
(Application filed Mar. 19, 1901.)
(No Model.)
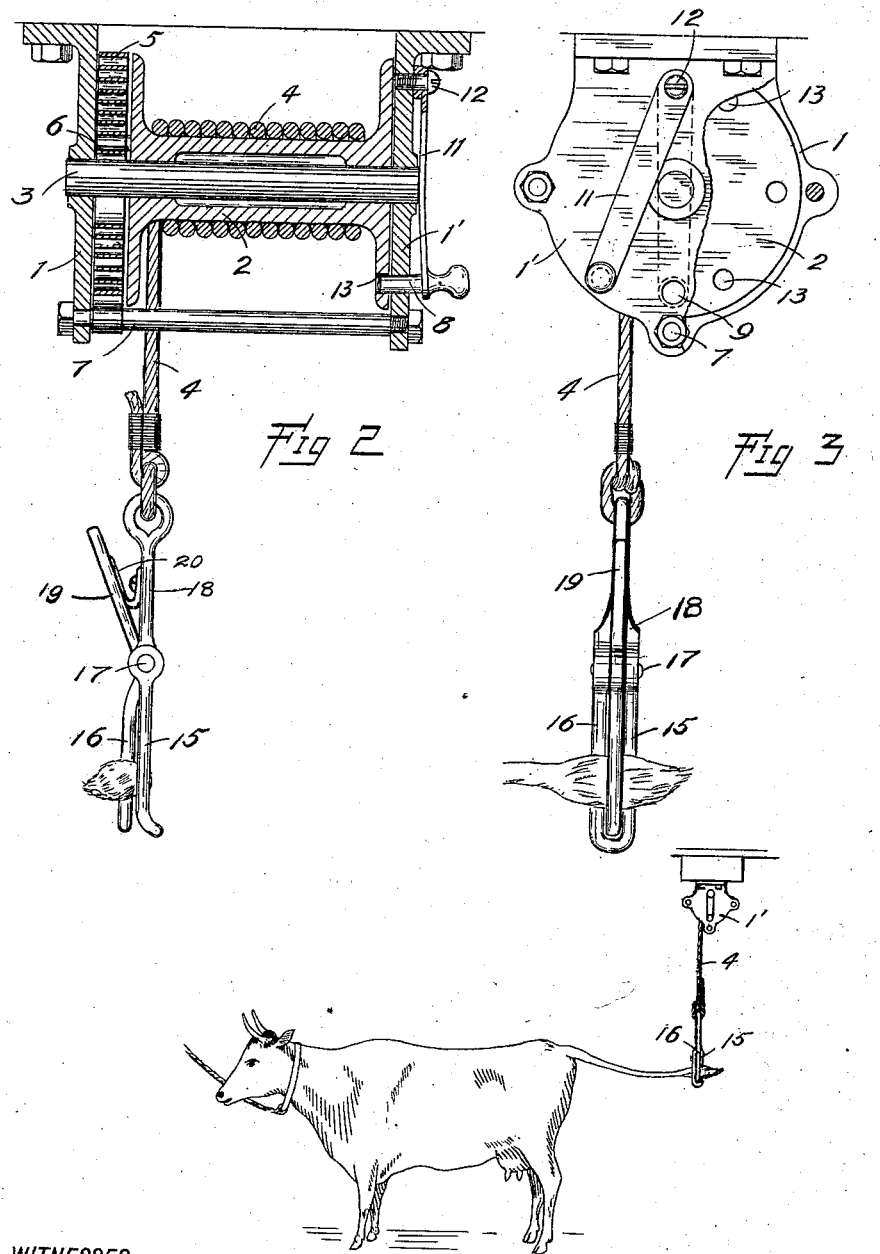

UNITED STATES PATENT OFFICE.

FRANK S. WEED, OF THORP, WASHINGTON.

COW-TAIL HOLDER.

SPECIFICATION forming part of Letters Patent No. 711,602, dated October 21, 1902.

Application filed March 19, 1901. Serial No. 51,872. (No model.)

*To all whom it may concern:*

Be it known that I, FRANK S. WEED, a citizen of the United States, residing at Thorp, in the county of Kittitas and State of Washington, have invented certain new and useful Improvements in Cow-Tail Holders, of which the following is a specification, reference being had therein to the accompanying drawings.

My invention relates to cow-tail holders; and it consists in the several novel features of construction and combination of parts hereinafter fully set forth, and pointed out in the claim.

The object of my invention is to provide a means of suspending a cow's tail at different heights while the animal is standing to be milked and also to keep the tail from the floor and away from the dirt when she is lying down.

In the drawings, where similar numerals represent like parts in all of the views, Figure 1 shows the animal with my invention attached to and supporting its tail. Figs. 2 and 3 are respectively a vertical transverse sectional view and a side elevation of my device.

In the figures the reference-numbers 1 1' indicate the frame-support for the reel, which is secured to a suitable place above the animal. 2 is a spool rotatable upon shaft 3, mounted in said frame. The frame-supports 1 1' are formed at their upper ends with outwardly-turned flanges to receive securing means, the outward turning of these flanges giving free space between the supports for the rotation of the reel.

5 is a coil-spring, one end of which is connected to the frame, preferably at the tie-rod 7, and the other end to a pin 6 in the spool-flange. Upon the opposite spool-flange are a number of holes or perforations 13, adapted to be engaged by a pin 8 upon a spring-arm 11 for locking the spool to any desired position. Wound about the spool is a line 4, to which is connected the tail-gripping device, consisting of two members connected together by a pivot 17, so as to form two jaws 15 16 and two handles 18 19. Positioned between the latter is a spring 20, secured to one and bearing against the other. The jaw 15 is slotted longitudinally, and the other, 16, is a tongue-jaw adapted to register one with the other, so when the tail-bush is introduced therebetween it is depressed within the slotted jaw, thus holding the same securely. I make one of the jaws, 15, of a loop shape, and the other, 16, acting upon the bush of the tail depresses it between the side pieces of the loop, holding the same securely.

The operation of the device is as follows: The gripping attachment is pulled down, unwinding the line 4 from the spool. The jaws 15 16 are opened by a pressure upon the handles 18 19, which being released grip the tail, and by the action of the spring 5 the spool coils the line until the tail is raised sufficiently high, when the arm 11 is swung around the pivot 12, as shown in Fig. 3. The pin 8 thereof, projecting through a hole 9 in the frame, engages with one of the aforesaid apertures 13 on the spool-flange, thus locking the same at the desired height.

This invention forms an efficient and reliable means for the accomplishment of the ends and objects noted, involving but few parts, so insuring simplicity and economy of construction, while the power used being a positively acting force obviates the use of weights and kindred devices, liable at all times to fail in their work, and danger of failure and getting out of order is reduced to a minimum.

Having thus described my invention, what I claim as new, and desire to secure by Letters Patent, is—

A tail-supporting device comprising a pair of supports, transverse tie-rods connecting the said supports, a stationary horizontal shaft mounted in said supports, a reel rotatably mounted on said shaft, annular flanges formed integral with the ends of said reel, one of said flanges having circumferentially-arranged apertures, an outwardly-extending pin formed on the other flange, a band-spring encircling the said shaft between the last-mentioned flange and the adjacent support and having one of its ends secured to the said pin and its other end connected to one of the tie-rods, a flat spring-arm pivotally connected to the outer face of one of the supports, an inwardly-projecting pin mounted on the lower end of the spring-arm, said pin adapted to project through an opening in the support and engage the apertured flange of the reel, a cord having one of its ends secured to the said reel in combination with the spring-pressed tail-gripping jaws carried by the other end of the cord, substantially as described.

In testimony whereof I affix my signature in presence of two witnesses.

FRANK S. WEED.

Witnesses:
C. R. HOVEY,
GRACE J. HOVEY.